Patented Nov. 10, 1953

2,658,909

UNITED STATES PATENT OFFICE 2,658,909

PROCESS FOR SEPARATION AND PURIFICATION OF ALKYL PHOSPHORIC ACIDS

Howard W. Crandall, Berkeley, Calif., and Donald C. Stewart, Park Forest, Ill., assignors to the United States of America as represented by the United States Atomic Energy Commission No Drawing. Application September 11, 1951, Serial No. 246,156

8 Claims. (Cl. 260—461)

This invention relates to a process for the separation and purification of alkyl phosphoric acids from the mixture obtained in the synthesis thereof, and more particularly, to a solvent extraction process for the separation and purification of mono- and di-alkyl substituted phosphoric acids contained in mixtures thereof.

The usual reactions employed in producing alkyl phosphoric acids produce mixtures of the mono- and di-alkyl phosphoric acids and the commercially available products are likewise mixtures thereof. Cherbuliez and H. Weniger (Helv. Chim. Acta., 28 1584 (1945)) have extensively studied the reaction of phosphoric anhydride with aliphatic alcohols. When the lower alcohols were used they indicate that very little $H_3PO_4$, almost no $R_3PO_4$, and $H_2RPO_4$ together with $HR_2PO_4$ in a ratio closely approximating 1:1 are formed. However, it has been found in connection with the present invention that with increase in the chain length of the alcohol substituent of the phosphoric acid through three or more carbon atoms the ratio of $H_2RPO_4/HR_2PO_4$ in the commercially available materials increases considerably. In any event it may be seen that the products of the synthesis reactions and the commercially available materials are mixtures of various forms of the particular alkyl phosphoric acid.

For many purposes it is desirable to employ a material composed principally of a particular form of the substituted acid as, for example, in the synthesis of various compounds to assure production of the desired compound and in many other situations wherein definitive and reproducible results are desired. Particularly beneficial results may be obtained in the use of such mono-constituent products as metal recovery extractants where the maximum degree of separation is required.

Now it has been found that a variety of the mono- and di-alkyl substituted phosphoric acid mixtures which are commercially available and those resulting from the usual preparative procedures may be resolved into substantially mono-constituent materials by dissolving or suspending such mixtures in particular solvents to produce a first phase and extracting said first phase with a second solvent immiscible in the first and possessing a preferential affinity for one of the dissolved forms of the alkyl-phosphoric acid, whereby said one of the dissolved forms preferentially enters said second phase. Further separation may be effected by treating the separated phases containing principally one of the forms of said alkyl phosphoric acid with fresh portions of the immiscible solvent forming the other phase, whereby the minimized amount of the secondary constituent contained therein is reduced further. Moreover, the method is adaptable to batch operation or, with even greater efficiency, to multiple stage countercurrent column operation.

It is therefore an object of the invention to provide an economical and efficient process for separating and purifying alkyl phosphoric acids.

Another object of the invention is to provide solvent extraction processes for separating particular alkyl phosphoric acids from a mixture thereof, yielding a product containing substantially only one form of such an alkyl phosphoric acid.

A further object of the invention is to provide a process wherein mono- and di-alkyl phosphoric acids are separated from each other by partitioning between mutually immiscible solvents having selective affinities for each of said acids.

A still further object of the invention is to provide a process wherein a particular alkyl phosphoric acid is extracted from a solution mixture of such acids with an immiscible solvent phase.

Further objects and advantages of the invention will become apparent from a consideration of the following specification.

The mixed nature of the synthesis products and commercially available materials is easily demonstrated by potentiometrically titrating aliquots thereof with standard base. A number of alkyl phosphoric acids were analyzed by potentiometrically titrating aliquots with standard sodium hydroxide solution using a glass electrode and a type G Beckman pH meter yielding the respective concentrations and molar ratios indicated in Table I. Such results were calculated assuming that no $H_3PO_4$ was present using the two breaks in the titration curves as an indication of the respective end points with the titre between the two breaks in the curve representing the amount of $H_2RPO_4$ and this value subtracted from the titre of the first break representing the value for the $HR_2PO_4$. As the octyl phosphoric acids emulsified very readily in water solutions it was found necessary to make a ten fold volume dilution with 75% ethyl alcohol before titrating. In general such curves correspond to the well-known form of the curves obtained by the titration of phosphoric acid with, of course, the number of breaks determined by the number of alkyl radicals substituted therein.

TABLE I

*Composition of alkyl phosphoric acids*

|  | Concentration | | Ratio, $H_2RPO_4$ / $HR_2PO_4$ |
|---|---|---|---|
|  | $H_2RPO_4$ | $HR_2PO_4$ |  |
| Ethyl Phosphoric Acid (Eastman) | 4.66 M | 4.36 M | 1.07 |
| n-Propyl Phosphoric Acid (Eastman) | 4.36 M | 3.15 M | 1.39 |
| n-Butyl Phosphoric Acid (Eastman) | 3.82 M | 2.48 M | 1.54 |
| Isobutyl Phosphoric Acid (Monsanto) | 3.57 M | 2.56 M | 1.39 |
| n-Amyl Phosphoric Acid (Monsanto) | 3.48 M | 1.81 M | 1.92 |
| n-Octyl Phosphoric Acid (Monsanto) | 2.01 M | 1.75 M | 1.15 |

The concept upon which the present process for separating any given pair of mono- and di-substituted alkyl phosphoric acids is predicated was verified when it was noted that titration of the alkyl phosphoric acid content of mutually immiscible phases which had been in contact yielded results indicating that the distribution of the two forms of the acids between the different phases was disproportionate. More particularly a mixture of 40 volumes percent butyl phosphoric acid in dibutyl ether was equilibrated with an equal volume of water, the two phases separated, and each phase washed individually with fresh equivalent volumes of the immiscible solvent of the other phase whereupon potentiometric titration of aliquots of the washed phases and of the wash liquids yielded titration curves in which the relative positions of the breaks in the curves were markedly displaced. Accordingly, it could be seen that the relative proportions of $H_2BuPO_4$ and $HBu_2PO_4$ had been markedly altered by such treatment with the former favoring the aqueous phase and the latter favoring the organic phase.

After the original dibutyl ether phase was subjected to seven additional extractions with equivalent volumes of water and the original aqueous phase was subjected to two additional extractions with fresh equivalent volumes of dibutyl ether, potentiometric titration of aliquots of the washed phases yielded titration curves having only a single, very sharp break therein, thereby indicating that only one of the original two constituents remained in each phase.

In view of the highly satisfactory degree of success achieved by the foregoing method, the method was repeated with the ethyl phosphoric acid and the n-propyl phosphoric acid mixtures; however, washing of the aqueous phase with water removed both of the two forms of the acid in each case. This unexpected and undesirable result is apparently due to a considerably decreased organic solvent (dibutyl ether) extractability of the $HR_2PO_4$ form of the acid and the modification disclosed below was devised in order to obviate the difficulty.

Employing a simpler batch type extraction method wherein two volumes of the phosphoric acid materials were equilibrated with four volumes each of water and of the particular solvent, satisfactory systems were discovered for all of the alkyl phosphoric acids indicated in Table I. Aliquots of each phase were titrated as discussed above and the distribution coefficients (E) of the mono- and di-alkyl acid forms were calculated. The results for these numerous experiments are summarized in Table II.

TABLE II

*Distribution of alkyl phosphoric acids between immiscible phases*

| Substituted Phosphoric Acid | Solvent | Distribution Coef. (E) into Solvent from $H_2O$ | |
|---|---|---|---|
|  |  | $EH_2RPO_4$ | $HR_2PO_4$ |
| ethyl | n-primary amyl alcohol | 0.69 | 1.7 |
|  | dibutyl carbitol | 0.14 | 0.51 |
| n-propyl | n-primary amyl alcohol | 0.86 | 5.4 |
|  | diisopropyl ether | --- | ≥1.000 |
| n-butyl | n-primary amyl alcohol | 2.9 | 39 |
|  | dibutyl carbitol | 2.1 | 15 |
|  | dibutyl ether | 0.66 | 11 |
| isobutyl | dibutyl ether | 0.54 | 6.2 |
| n-amyl | dibutyl ether | 0.72 | ~760 |
| n-octyl | diethyl ether | 42 | ~106 |
|  | methyl isobutyl ketone | 28 |  |
| n-octyl | dibutyl ether | [1] 0.44 | [1] 7.0 |

[1] Out of diethylene glycol rather than water.

Using the above method (generally coupled with successive washing with the second solvent) completely separated solutions of diethyl phosphoric acid in n-amyl alcohol, dipropyl phosphoric acid in isopropyl and dibutyl ethers, dibutyl phosphoric acid in n-amyl alcohol and in dibutyl ether, diisobutyl phosphoric acid in dibutyl ether, diamyl phosphoric acid in dibutyl ether, dioctyl phosphoric acid in dibutyl ether and monobutyl phosphoric acid in water were prepared. However, it should be noted that in each case the second component could have likewise been obtained in the second immiscible phase by merely carrying out the remainder of the indicated and required operations. Moreover, such separated and purified materials may be obtained solvent free merely by appropriate recovery treatment as by distillation although, for a great many purposes, use of the solutions produced as described may be more convenient or otherwise preferred.

While in the foregoing the processes have been described with reference to single or multiple batch type extractions it should be noted that countercurrent column extraction techniques may be even more favorably employed. In general, the most satisfactory separation is obtained when the $HR_2PO_4$ distribution coefficient (E) is greater than 5, coupled with a corresponding E value of less than 1 for the $H_2RPO_4$ form, i. e., when the ratio of the E values exceeds 5 when employing a batch process. With the use of the countercurrent column techniques separations are quite satisfactory when the two E values differ by a factor of about three or more.

With respect to the foregoing materials it may be noted that the ethyl phosphoric acid process operated with a lesser degree of efficiency and may be considered a special case among those of the other materials noted. The case of the n-octyl phophoric acids is special also in that, when water is employed as one of the solvents, both forms of the acid appeared to have very high extractability and moreover the material emulsified to such an extent that vigorous centrifuging is required to separate the phases. However, this difficulty is entirely obviated when diethylene glycol is substituted for the water and a very satisfactory separation is obtained as the extraction coefficients are, respectively, of very favorable magnitudes.

With respect to the purity of the materials produced by batch processes generally similar to those indicated, it may be noted that 2 volumes of the n-butyl, isobutyl and n-amyl (di-alkyl)

forms of the acids equilibrated with four volumes each of water and dibutyl ether, after separation of the organic phase from the aqueous and seven subsequent washings with water, yielded titration curves having but one sharp break, i. e., the pH rose very sharply from a value of below about pH 3 to above a value of above about pH 11 with only a small incremental addition of base as the endpoint of the titration was reached. Titrations were performed on aliquots dissolved in 20 ml. of water.

The n-propyl acid suspended in iso-propyl ether and similarly equilibrated eight successive times with portions of water and the ethyl phosphoric acid similarly suspended in n-amyl alcohol and washed six times with water yielded substantially identical results upon subsequent titration. Substantially similar results were also obtained with the di-n-octyl phosphoric acid after suspension of the mixture in dibutyl ether and equilibration eight successive times with diethylene glycol. However, in this case titration was performed on an aliquot diluted with a tenfold volume of ethyl alcohol as described above. As may be seen from such criteria, the separated materials are of a very high degree of purity and the products comprise substantially only one form of the alkyl phosphoric acid.

The fundamental factors essential to the operation of the foregoing processes do not easily lend themselves to scientific rationalization. However, in general, it may be said that the process depends upon the selection of immiscible components of a two phase liquid system (aqueous and organic) in each of which immiscible phases one each of the alkyl phosphoric acid forms is preferentially soluble or extractable without undue interference by side effects such as the emulsion effects noted with the octyl forms. Water is an adequate solvent in all cases with the exception of the octyl forms and perhaps other of the higher molecular weight substituted acids in which case diethylene glycol is the solvent of choice and which, for descriptive practical purposes, may be considered as the aqueous solvent phase. n-Primary amyl alcohol serves well as the solvent of the organic phase with the lower substituted acids while dibutyl ether is preferred with the heavier members of the series of phosphoric acids described. Other satisfactory solvents are as noted in Table II. Moreover, it is considered that any two immiscible solvents should likewise be operable provided that they possess the appropriate solubilities and ratio of extraction coefficients indicated above and it may be expected that other suitable solvents may be found in the liquid alcohols, ketones, glycols and other low-molecular weight oxygenated hydrocarbons.

In the foregoing the term "equilibrating" has been generically employed to include the operation of producing a system including an organic solvent phase, an immiscible second phase (generally aqueous or, for the purposes of the invention, a phase may be considered to posses an aqueous character) and the mixture of phosphoric acids and maintaining the system in operative contact for a sufficient period of time to allow the extraction reactions (partitioning) into the respective phases to arrive at equilibrium values. For convenience, the acid is generally suspended in the organic phase, before contact with the aqueous, as it is generally more soluble therein; however, the alternative procedure may also be employed as well as a procedure wherein the acid is added to the prepared phase system.

While in the foregoing there has been described what may be considered to be preferred embodiments of the invention, it is considered that modification may be made therein without departing from the spirit of the invention and it is intended to cover all such that fall within the scope of the appended claims.

What is claimed is:

1. In a process for separating and purifying the mono- and di-alkyl forms of a phosphoric acid wherein the alkyl substituent radical contains less than nine carbon atoms, the steps comprising equilibrating such phosphoric acids with a first phase exhibiting aqueous characteristics and composed of a material selected from the group consisting of water in the case of all such acids having alkyl radicals smaller than octyl and diethylene glycol in the case of octyl phosphoric acid and with a second phase composed of materials selected from the group consisting of amyl alcohol, dibutyl carbitol, diisopropyl ether, dibutyl ether, diethyl ether and methyl isobutyl ketone, whereby the mono-alkyl form of such acid preferentially enters said first phase and the di-alkyl form preferentially enters said second phase, separating said phases, and washing the separated phases with the solvent of the other phase to remove minor amounts of the secondary component thereby purifying the primary constituent extracted therein.

2. In a process for separating mono- and diethyl phosphoric acids contained in a mixture thereof, the steps comprising equilibrating such acid mixture with an aqueous phase and an organic solvent phase selected from the group consisting of amyl alcohol and dibutyl carbitol, whereby the monoethyl phosphoric acid preferentially enters the aqueous phase and the diethyl phosphoric acid preferentially enters the organic phase, separating the phases, and washing said phases with the solvent of the other phase to remove minor amounts of the contaminating phosphoric acid form.

3. In a process for separating mono- and dipropyl phosphoric acids contained in a mixture thereof, the steps comprising equilibrating such acid mixture with an aqueous phase and an organic solvent phase selected from the group consisting of amyl alcohol and diisopropyl ether, whereby the monopropyl phosphoric acid preferentially enters the aqueous phase and the dipropyl phosphoric acid preferentially enters the organic phase, washing said aqueous phase with fresh volumes of the solvent of said organic phase to remove dipropyl phosphoric acid therefrom, and washing the organic phase with water to remove monopropyl phosphoric acid therefrom.

4. In a process for separating mono- and dibutyl phosphoric acids contained in a mixture thereof, the steps comprising equilibrating such acid mixture with an organic solvent phase selected from the group consisting of amyl alcohol, dibutyl carbitol and dibutyl ether and an aqueous phase, whereby the monobutyl phosphoric acid preferentially enters the aqueous phase and the dibutyl phosphoric acid preferentially enters the organic solvent phase, separating said phases, washing the aqueous phase with fresh organic phase solvent to remove minor amounts of dibutyl phosphoric acid extracted therein, and washing the organic phase with water to remove minor amounts of monobutyl phosphoric acid extracted therein.

5. In a process for separating mono- and diamyl phosphoric acids contained in a mixture thereof, the steps comprising equilibrating such mixture with dibutyl ether as an organic solvent phase and with an aqueous phase, whereby the monoamyl phosphoric acid preferentially enters the aqueous phase and the diamyl phosphoric acid preferentially enters the organic phase, separating said phases, washing said aqueous phase with fresh dibutyl ether to remove minor amounts of diamyl phosphoric acid remaining therein, and washing the organic phase with water to remove minor amounts of monoamyl phosphoric acid remaining therein.

6. In a process for separating mono- and dioctyl phosphoric acids contained in a mixture thereof, the steps comprising equilibrating such acid mixture with an aqueous phase selected from the group consisting of water and diethylene glycol and an organic solvent phase selected from the group consisting of diethyl ether, methyl isobutyl ketone and dibutyl ether, whereby the monooctyl phosphoric acid preferentially enters the aqueous phase and the dioctyl phosphoric acid preferentially enters the organic solvent phase, separating said phases, washing said aqueous phase with fresh volumes of said organic solvent to remove minor amounts of dioctyl phosphoric acid remaining therein, and washing said organic phase with fresh volumes of the aqueous solvent to remove minor amounts of monooctyl phosphoric acid remaining therein.

7. In a process for separating mono- and dioctyl phosphoric acids contained in a mixture thereof, the steps comprising equilibrating such acid mixture with diethylene glycol and dibutyl ether phases, whereby the monooctyl form preferentially enters the diethylene glycol phase and the dioctyl form preferentially enters the dibutyl ether phase, separating said phases, washing the diethylene glycol phase with fresh dibutyl ether to remove minor amounts of dioctyl phosphoric acid remaining therein, and washing the dibutyl ether phase with fresh diethylene glycol to remove minor amounts of monooctyl phosphoric acid remaining therein.

8. In a process for separating and purifying the components of a mixture of mono- and dialkyl forms of a phosphoric acid wherein the alkyl radical contains less than nine carbon atoms, the steps comprising equilibrating such phosphoric acid mixture with a first phase exhibiting aqueous characteristics and composed of a material selected from the group consisting of water in the case of all of such acids having alkyl radicals smaller than octyl and diethylene glycol in the case of octyl phosphoric acid and with a second phase composed of a material selected from the group consisting of amyl alcohol, dibutyl carbitol, diisopropyl ether, dibutyl ether, diethyl ether and methyl isobutyl ketone, whereby the mono-alkyl form preferentially enters said first phase and the di-alkyl form preferentially enters said second phase, separating said phases, washing the separated phases with fresh portions of the solvent of the other phase to purify the preferentially extracted form of the acid, and recovering the purified alkyl phosphoric acid from the separated phases.

HOWARD W. CRANDALL.
DONALD C. STEWART.

References Cited in the file of this patent

UNITED STATES PATENTS

| Number | Name | Date |
|---|---|---|
| 2,523,243 | Willis | Sept. 19, 1950 |

OTHER REFERENCES

Plaut, J. Biol. Chem., vol. 184, pages 243–249 (1950).

Perry, Chemical Engineer's Handbook, 1950, pages 14–15.